United States Patent
Mämmilä et al.

(10) Patent No.: US 7,942,034 B2
(45) Date of Patent: May 17, 2011

(54) TESTING SYSTEM

(75) Inventors: Tuomo Mämmilä, Oulu (FI); Mika Piirainen, Oulu (FI); Mika Kellokoski, Haukipudas (FI)

(73) Assignee: JOT Automation Oy, Oulu (FI)

( * ) Notice: Subject to any disclaimer, the term of this patent is extended or adjusted under 35 U.S.C. 154(b) by 384 days.

(21) Appl. No.: 12/097,375

(22) PCT Filed: Dec. 28, 2005

(86) PCT No.: PCT/FI2005/050491
§ 371 (c)(1), (2), (4) Date: Jun. 13, 2008

(87) PCT Pub. No.: WO2007/074202
PCT Pub. Date: Jul. 5, 2007

(65) Prior Publication Data
US 2008/0314169 A1 Dec. 25, 2008

(51) Int. Cl.
G01M 3/02 (2006.01)
G01N 19/00 (2006.01)

(52) U.S. Cl. .......................... 73/37; 73/865.9
(58) Field of Classification Search ........... 73/37, 865.9; 702/14
See application file for complete search history.

(56) References Cited

U.S. PATENT DOCUMENTS

| | | | | |
|---|---|---|---|---|
| 3,597,981 A | 8/1971 | Wakabayashi et al. | ...... | 73/865.9 |
| 6,581,483 B1 * | 6/2003 | Yeh | .............................. | 73/865.3 |

FOREIGN PATENT DOCUMENTS

| | | |
|---|---|---|
| DE | 2144542 | 3/1973 |
| JP | 6099365 | 4/1994 |
| JP | 2003074511 | 3/2003 |
| SU | 491072 | 11/1975 |

* cited by examiner

Primary Examiner — Hezron Williams
Assistant Examiner — Tamiko D Bellamy
(74) Attorney, Agent, or Firm — Hoffmann & Baron, LLP

(57) ABSTRACT

A system for testing a mechanical input device of a wireless telecommunication device is provided, where the system comprises a pressure air regulator comprising: a receive unit comprising an inlet aperture and a first contact surface with at least one exit aperture connected to the inlet aperture; a distribution unit rotatably pivoted relative to the receive unit, the distribution unit comprising a second contact surface, which contacts the first contact surface and comprises at least two entrance apertures located at a rotational trajectory of the at least one exit aperture. The distribution unit further comprises at least two distribution apertures, each connected to an entrance aperture, thus providing pressure air when the entrance aperture overlaps with the exit aperture.

7 Claims, 4 Drawing Sheets

TESTING SYSTEM

CROSS-REFERENCE TO RELATED APPLICATION

This application is a National Phase application of International Application No. PCT/FI2005/050491 filed Dec. 28, 2005, which is incorporated herein by reference.

BACKGROUND OF THE INVENTION

1. Field of the Invention

The invention relates to a testing system for testing a mechanical input device of a wireless telecommunication device.

2. Background Description of the Related Art

The manufacture of wireless telecommunication devices involves a complex testing procedure where a wireless telecommunication device is subjected to various test phases. In one test phase, a mechanical input device is tested by directing a sequence of mechanical typing to the mechanical input device and analyzing the response of the typing.

Pressure air and cylinder-piston arrangements are typically employed to drive the mechanical typing. The sequencing of the mechanical typing is typically implemented with electrically controlled valves coupled with the cylinders.

The great number of keys of the mechanical input devices, however, requires a complex valve system involving a great number of valves and associated control electronics.

Therefore, it is useful to consider techniques for testing a mechanical input device of a wireless telecommunication device.

SUMMARY OF THE INVENTION

An object of the invention is to provide an improved system for testing a mechanical input device of a wireless telecommunication device. According to an aspect of the invention, there is provided a system for testing a mechanical input device of a wireless telecommunication device, the system comprising a pressure air regulator comprising: a receive unit comprising an inlet aperture and a first contact surface, the first contact surface comprising at least one exit aperture connected to the inlet aperture; a distribution unit rotatably pivoted relative to the receive unit, the distribution unit comprising a second contact surface, the second contact surface contacting the first contact surface and comprising at least two entrance apertures located at a rotational trajectory of the at least one exit aperture, the distribution unit further comprising at least two distribution apertures, each connected to an entrance aperture, thus providing pressure air when the entrance aperture overlaps with the exit aperture; and a rotating means for generating a relative rotation of the receive unit and the distribution unit.

The invention provides several advantages. The invention enables a simple mechanism to distribute pressure air from a single pressure air source to a plurality of actuators.

BRIEF DESCRIPTION OF THE DRAWINGS

In the following, the invention will be described in greater detail with reference to the embodiments and the accompanying drawings, in which.

DETAILED DESCRIPTION OF THE PREFERRED EMBODIMENTS.

Figure 1:
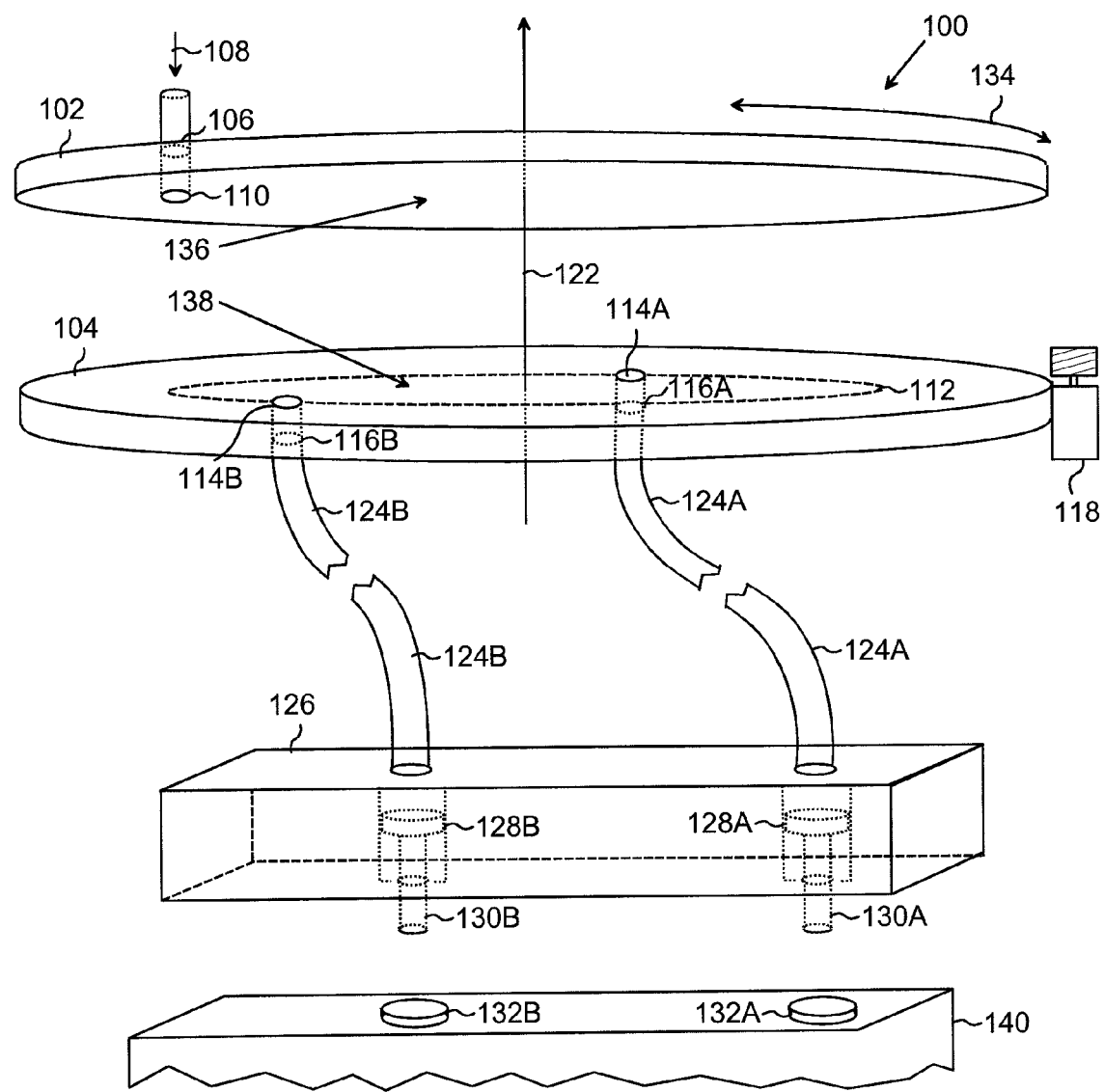
FIG. 1 shows a first example of the structure of a testing system.

With reference to FIG. 1, an exploded diagram of a testing system comprising a pressure air regulator 100 is shown. The pressure air regulator 100 comprises a receive unit 102 and a distribution unit 104.

The receive unit 102 comprises an inlet aperture 106 for receiving pressure air 108 from a pressure air source, such as an air pump or a gas container.

The receive unit 102 further comprises an exit aperture 110 connected to the inlet aperture 106, thus providing pressure air 108 when the inlet aperture 106 is connected to the pressure air source.

The receive unit 102 further comprises a first contact surface 136 which comprises the exit aperture 110.

The distribution unit 104 comprises a second contact surface 138, which contacts the first contact surface 136 when the pressure air regulator 100 has been assembled.

When assembled, the distribution unit 104 is rotatably pivoted relative to the receive unit 102, thus enabling a relative rotation 134 about a rotational axis 122 of the receive unit 102 and the distribution unit 104. During the relative rotation 134, the exit aperture 110 rotates along a rotational trajectory 112 on the second contact surface 138.

The distribution unit 104 comprises at least two entrance apertures 114A, 114B located at the rotational trajectory 112, and distribution apertures 116A, 116B, each connected to an entrance aperture 114A, 114B. In the example of FIG. 1, the distribution apertures 116A and 116B are connected to the entrance apertures 114A and 114B, respectively.

At a predetermined relative rotational angle, the exit aperture 110 overlaps an entrance aperture 114A, 114B one at a time depending on the rotational location of the entrance apertures 114A, 114B, thus connecting a distribution aperture 116A, 116B corresponding to an overlapping entrance aperture 114A, 114B to the pressure air source. At rotational angles when no overlap occurs, the entrance aperture 114A, 114B contacts the first contact surface 136, and the flow of pressure air 108 into the entrance aperture 114A, 114B is reduced.

The first contact surface 136 and the second contact surface 138 are fitted so that in the proximity of the entrance apertures 114A, 114B, the first contact surface 136 and the second contact surface 138 form an air tight coupling in order to reduce the pressure air 108 from leaking to a non-overlapping entrance aperture 114A, 114B. The requirements of air-tightness depend on the pressure of the pressure air 108 and other characteristics, such as the sensitivity of actuators using the pressure air 108 as a driving mechanism. Therefore, the concept of air-tightness is a relative measure rather than an absolute measure.

FIG. 1 further shows rotating means 118 for generating the relative rotation 134 of the receive unit 102 and the distribution unit 104. The rotating means 118 may be an electric motor, a pressure air motor or another mechanism capable of generating the relative rotation 134.

In an embodiment of the invention, the rotating means comprises a body fixed to the distribution unit 102 and a rotating element coupled with the receive unit 102. The rotating element rotates with respect to the body, thus causing the receive unit 102 to rotate relative to the distribution unit 104.

The receive unit 102 is typically manufactured from a solid material, such as metal, plastic or ceramics.

The distribution unit 104 is typically manufactured from a solid material, such as metal, plastic or ceramics.

The pressure air regulator 100 enables pressure air 108 to be provided from the distribution apertures 116A, 116B according to a regulation sequence determined by the configuration of the entrance apertures 114A, 114B and the relative rotational speed of the receive unit 102 and the distribution unit 104. The pressure air 108 outputted by each distribution aperture 116A, 116B may be applied to generate a mechanical force in an actuator, which applies the mechanical force to a mechanical input device 140 under a test.

The receive unit 102 may comprise a plurality of inlet apertures 106 and exit apertures 110, which each may have a specific rotational trajectory 112. The distribution unit 104 may have entrance apertures 114A, 114B and distribution apertures 116A, 116B at different rotational trajectories 112.

In an embodiment of the invention, the testing system comprises pipes 124A, 124B for conveying pressure air 108, and a remote actuator array 126 for pressing keys 132A, 132B of the mechanical input device 140 based on pressure air 108.

The mechanical input device 140 is typically a mechanical interface, such as a keyboard or a keypad, for receiving a mechanical input from a user of a wireless telecommunication device. The mechanical input device 140 comprises at least one key 132A, 132B. The key 132A, 132B may be connected to an electric or optical switch, thereby transforming the mechanical input into an electric or optical signal.

The wireless telecommunication device may also be referred to as a mobile phone, a cellular phone, user equipment, a mobile station, a mobile terminal and/or a wireless telecommunication modem. The present solution is not, however, restricted to the listed devices, but may be applied to any wireless telecommunication device connectable to a wireless telecommunication network.

The remote actuator array 126 comprises remote cylinders 128A, 128B and remote pistons 130A, 130B in each remote cylinder 128A, 128B. Each remote cylinder 128A, 128B is connected to a pipe 124A, 124B, thus receiving pressure 108 from the pressure air source according to the regulation sequence. The pressure air 108 drives the remote pistons 130A, 130B which press the keys 132A, 132B of the mechanical input device 140.

The pipes 124A, 124B may be rigid or flexible metal, plastic or rubber pipes, for example, suitable for conveying pressure air 108. The use of the pipes 124A, 124B and the remote actuator array 126 enable the pressure air regulator 100 to be located remotely from an actual testing point of a testing arrangement. Furthermore, the use of the pipes 124A, 124B and the remote actuator array 126 enable a pressure air output taken for a plurality of actuator arrays 126 from a single pressure air regulator 100.

A configuration of the remote cylinders 128A, 128B of the remote actuator array 126 is typically selected on the basis of the configuration of the keys 132A, 132B.

The remote actuator array 126 is typically made of solid material, such as plastic or metal.

Figure 2:
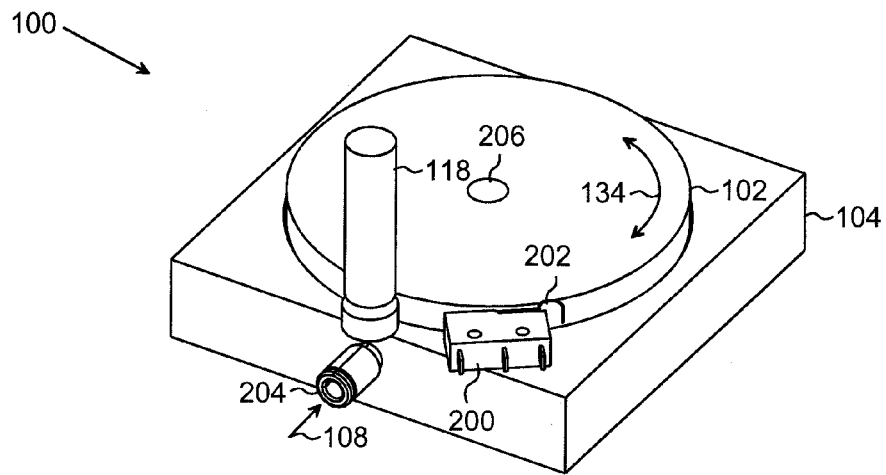
FIG. 2 illustrates a first example of the pressure air regulator according to a first embodiment of the invention.
Figure 3:
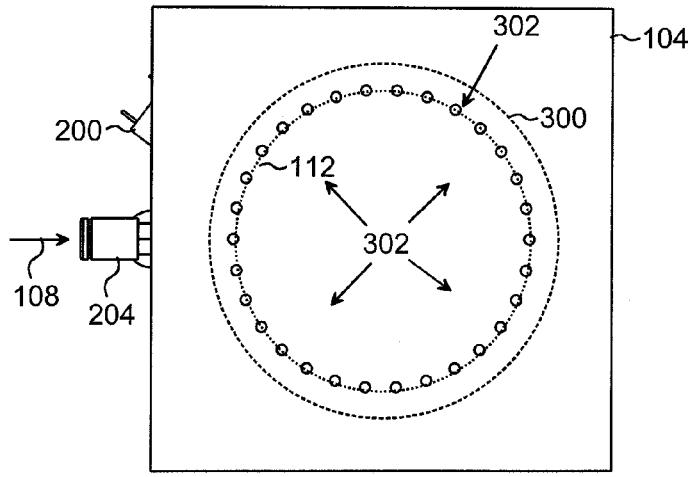
FIG. 3 illustrates a second example of the pressure air regulator according to the first embodiment of the invention.
Figure 4:
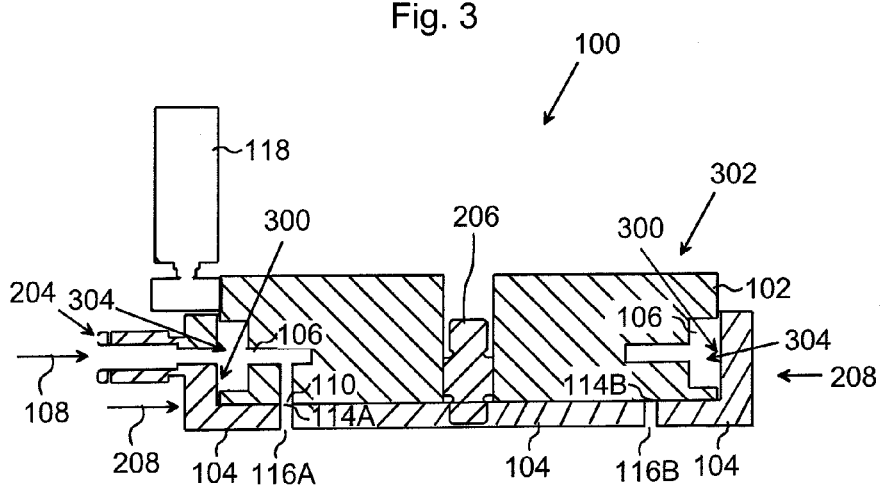
FIG. 4 illustrates a third example of the pressure air regulator according to the first embodiment of the invention.

With reference to FIGS. 2 to 4, in an embodiment of the invention, the distribution unit 104 forms a spherically symmetric chamber 302, and the receive unit 102 comprises a spherical disk-like structure fitted into the spherically symmetric chamber 302. The spherical symmetry of the spherically symmetric chamber 302 and the fitting of the disk-like structure of the receive unit 104 enable the relative rotation 134 of the receive unit 104 and the distribution unit 104 while providing an air-tight fitting between the two.

FIG. 2 shows the receive unit 102 and the distribution unit 104. A portion of the receive unit 102 exceeds the top of the distribution unit 104, and another portion of the receive unit 102 is located in the spherically symmetric chamber formed into the distribution unit 104. FIG. 2 further shows a switch 200 and an indication groove 202, which are used for monitoring the relative rotational position of the receive unit 102 and the distribution unit 104. The switch 200 may be connected to control electronics which control the rotating means 118. The receive unit 102 may be attached to the distribution unit 104 with an axis 206.

With reference to FIG. 3, the distribution unit 104 may comprise a plurality of entrance apertures 302 located at the rotational trajectory 112. FIG. 3 further shows the location of the inner surface 300 of the spherical symmetric chamber 302.

With reference to FIG. 4, the spherical symmetric chamber 302 is confined by the inner surface 300 of the side wall 208. The receive unit 102 comprises the spherical disk-like structure which is fitted into the spherically symmetric chamber 302. The spherical disk-like structure may be dimensioned so that the spherical disk-like structure may be rotated in the spherically symmetric chamber 302, and spherical disk-like structure and the inner surface 302 form an air-insulating contact.

With further reference to the example of FIG. 4, the distribution unit 104 further comprises an air inlet 204 through a side wall 208 of the spherically symmetric chamber 302. The inlet aperture 106 has been formed in the side of the receiving unit 102. The air inlet 204 and the inlet aperture 106 are positioned so that they contact each other over a predetermined rotational angle of the distribution unit 104 and the receive unit 102.

The receiver unit 102 may comprise a hollow band 304 around the receiver unit 102. The hollow band 304 may receive the pressure air 108 from the air inlet 204 in any relative rotational position of the receiver unit 102 and the distribution unit 104. The inlet aperture 106 is connected to the hollow band 304, and an air channel is open between the air inlet 204 and the distribution aperture 116A in a specific relative rotational position of the receiver unit 102 and the distribution unit 104.

Figure 5:
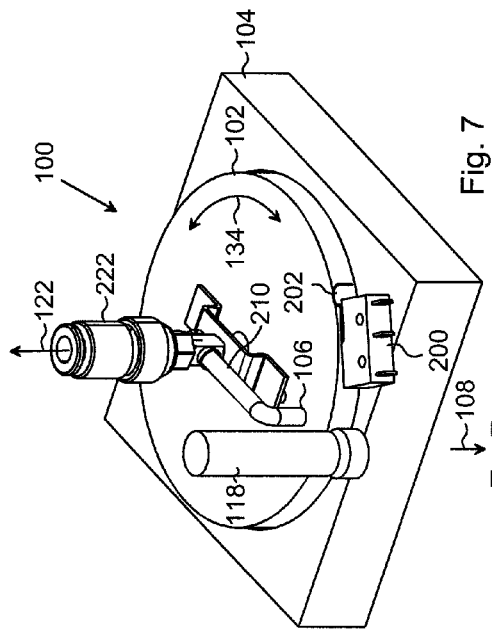
FIG. 5 illustrates a first example of the pressure air regulator according to a second embodiment of the invention.
Figure 6:
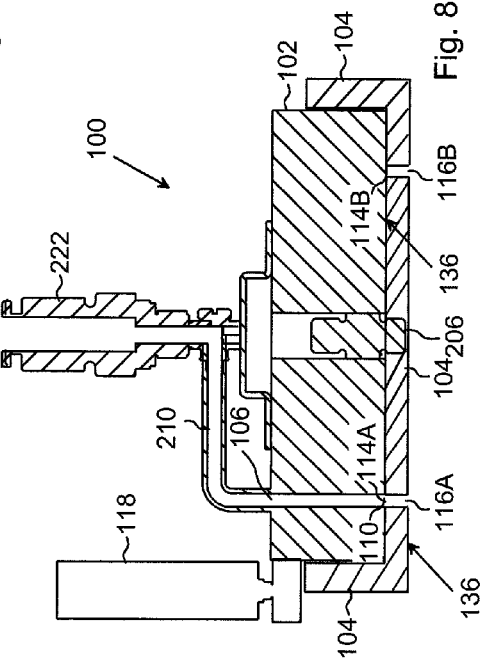
FIG. 6 illustrates a second example of the pressure air regulator according to a second embodiment of the invention.

With reference to FIGS. 5 and 6, the inlet aperture 106 may be positioned in the top of the receiver unit 102. In an example of FIG. 6, the receiver unit 106 may be coupled to or integrated with an adapter 220 located at the rotational axis 122. The adapter 220 may be connected to the pressure air source over an air hose, for example. The air hose may be connected to the adapter 220 with a rotation free-mechanism, which allows relative rotation of the air hose and the adapter 220.

FIG. 6 shows an air channel 230 connecting an off-axial exit aperture 110 to an axial inlet aperture 106. The air channel 230 provides a pressure air transfer in a radial direction and allows a freedom to choose the radial location of the exit aperture 110 on the first contact surface 136. In FIG. 6, the air channel is 230 formed inside the receiver unit 102.

Figure 7:
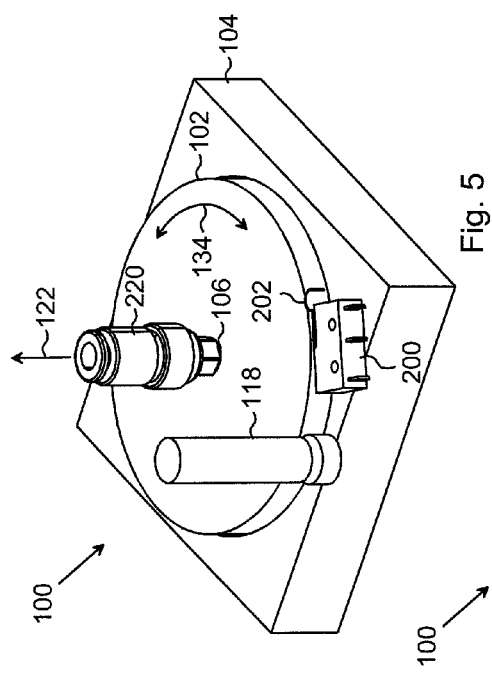
FIG. 7 illustrates a first example of the pressure air regulator according to a third embodiment of the invention.
Figure 8:
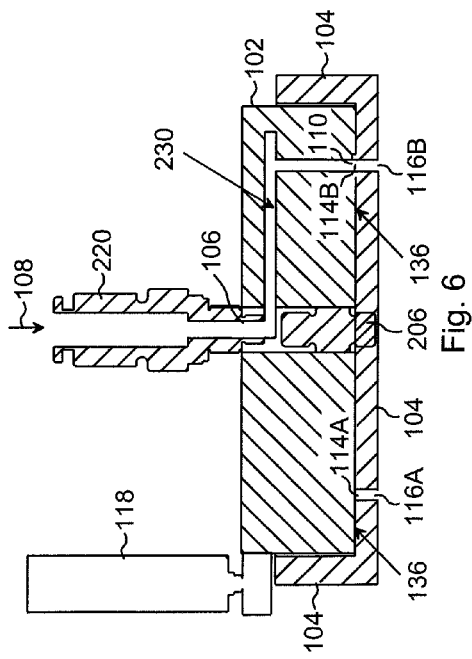
FIG. 8 illustrates a second example of the pressure air regulator according to a third embodiment of the invention.

FIGS. 7 and 8 show an embodiment of the pressure regulator 100 comprising an external air channel 210, such as a tube, connecting an axial adapter 222 to an off-axial inlet aperture 106.

Figure 9:
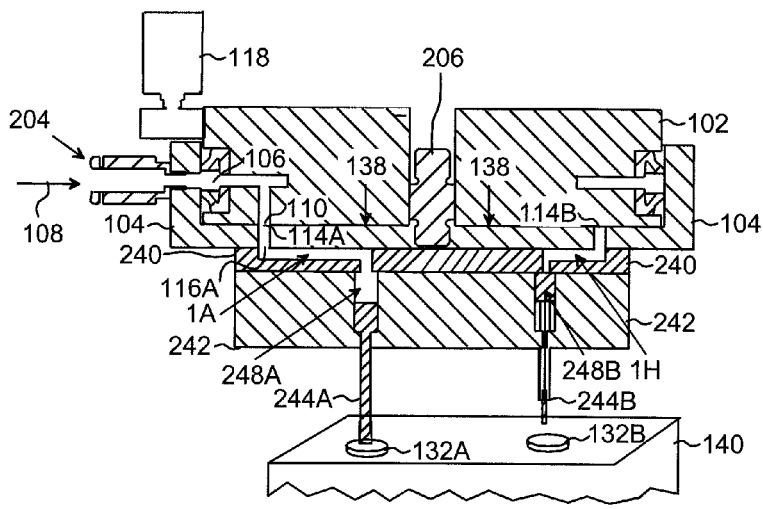
FIG. 9 illustrates a first example of the testing system according to an embodiment of the invention.

With reference to FIG. 9, in an embodiment of the invention, the testing system further comprises an integrated actuator array 242 for pressing keys 132A, 132B of the mechanical input device 140 based on the pressure air 108. The integrated actuator array 242 is integrated into the pressure air regulator 100 and is operationally coupled to the distribution unit 104.

The integrated actuator array 242 comprises integrated cylinders 248A, 248B and pistons 244A, 244B. Each integrated cylinder 248A, 248B is operationally connected to a distribution aperture 116A, 116B.

The integrated structure of the pressure air regulator 100 and the integrated actuator array 242 provides a compact functional unit, which may be located in a test chamber of a testing system. The integrated structure enables to minimize the number of pressure air inputs into the test chamber, thus simplifying the structure of the test chamber.

The integrated actuator array 242 is typically made of a solid material, such as plastic, ceramics or metal. The integrated actuator array 242 may be a disk-like structure mounted into the pressure air regulator 100 with bolts or with other detachable assembling means, thus enabling different integrated actuator arrays 242 to be applied with a single pressure air regulator 100. An integrated actuator array 242 may be configured according to the mechanical input test device 140 to be tested.

Figure 10:
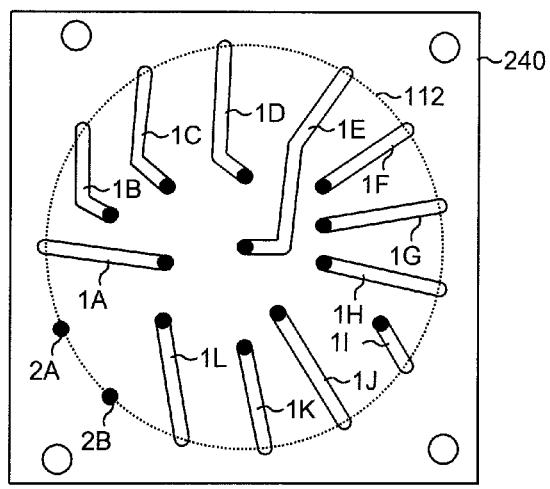
FIG. 10 illustrates a second example of the testing system according to an embodiment of the invention.

With reference to FIGS. 9 and 10, the testing system may comprise at least one transfer channel 1A to 1L for connecting an integrated cylinder 248A, 248B to an entrance aperture 114A, 114B. The transfer channel 1A to 1L transfers pressure air 108 at the level of the second contact surface 138. FIG. 10 shows the configuration of the transfer channels 1A to 1L from the direction of the receive unit 102. Openings from the transfer channels 1A to 1L to integrated cylinders 248A, 248B are shown with black dots. The transfer channels 1A to 1L overlap the rotation trajectory 112. FIG. 10 also shows openings 2A, 2B which lead directly to the entrance aperture 114A, 114B.

The pressure air regulator 100 of FIGS. 9 and 1 may be similar to that shown in FIGS. 2 to 4.

The transfer channels 1A to 1L enable the integrated cylinders 248A, 248B to be located freely according to the key configuration of the mechanical input test device 140 to be tested.

In an embodiment of the invention, the testing system comprises a transfer unit 240 between the distribution unit 104 and the actuator array 242. The transfer unit 240 comprises a transfer channel 1A to 1L as a groove on the surface of the transfer unit 240. A groove side of the transfer unit 240 is faced with the distribution unit 104, and the side with openings is faced with the integrated actuator array 242. The transfer unit 240 is typically made of a solid material, such as plastic, ceramics or metal. The transfer unit 240 may be a disklike structure mounted in the pressure air regulator 100 with bolts or with other detachable assembling means, thus enabling different integrated actuator arrays 242 to be applied with a single pressure air regulator 100. The transfer unit 240 may be configured according to the mechanical input test device 140 to be tested.

In an embodiment of the invention, the transfer channels 1A to 1L are formed on the surface of the distribution unit 104. In such a case, a separate transfer unit 240 may not be needed.

In an embodiment of the invention, the transfer channels 1A to 1L are formed on the surface of the integrated actuator array 242.

Figure 11:
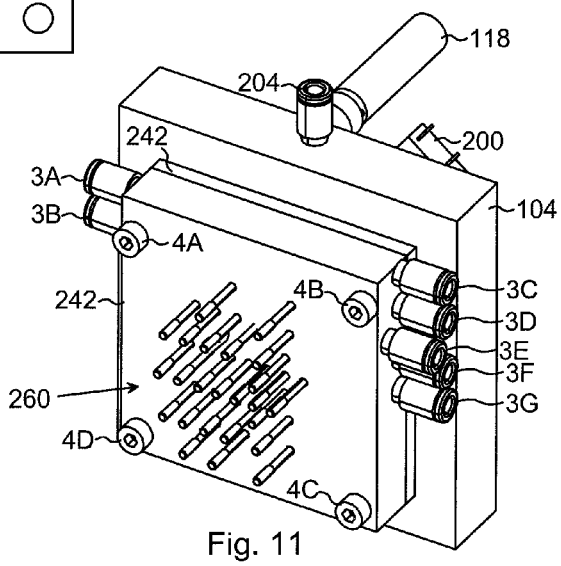
FIG. 11 illustrates a third example of the testing system according to an embodiment of the invention.

With reference to FIG. 11, the integrated actuator array 242 may comprise pressure air outputs 3A to 3G on the sides of the integrated actuator array 242 for providing pressure air for device external to the integrated actuator array 242. FIG. 11 further shows assembling bolts 4A to 4D for fixing the integrated actuator array 242 to the pressure air regulator.

The pistons 260 are configured according to the mechanical input test device 140 to be tested.

Even though the invention has been described above with reference to an example according to the accompanying drawings, it is clear that the invention is not restricted thereto but it can be modified in several ways within the scope of the appended claims.

What is claimed is:

1. A pressure air regulator comprising:
    a receive unit comprising an inlet aperture and a first contact surface, the first contact surface comprising at least one exit aperture connected to the inlet aperture;
    a distribution unit rotatably pivoted relative to the receive unit, the distribution unit comprising a second contact surface, the second contact surface contacting the first contact surface and comprising at least two entrance apertures located at a rotational trajectory of the at least one exit aperture, the distribution unit further comprising at least two distribution apertures, each connected to an entrance aperture, thus providing pressure air when the entrance aperture overlaps with the exit aperture; and
    a rotating means for generating a relative rotation of the receive unit and the distribution unit, the pressure air regulator configured to test a mechanical input device of a wireless telecommunication device, the distribution unit comprising a radially symmetric chamber, the receive unit comprising a radially symmetric disk-like structure fitted into the radially symmetric chamber and being rotationally conjugated with the distribution unit by an axis.

2. The system of claim 1, wherein the first contact surface and the second contact surface are arranged to form an airtight coupling in the proximity of the entrance aperture in order to reduce the pressure air from leaking to an entrance aperture which is in a non-overlapping position relative to the exit aperture.

3. The system of claim 1, wherein the system further comprises:
    pipes for conveying pressure air, each pipe connected to a distribution aperture; and
    a remote actuator array for pressing keys of the mechanical input device based on pressure air, the remote actuator array comprising remote cylinders and remote pistons, each remote cylinder connected to a pipe.

4. The system of claim 1, wherein the system further comprises an integrated actuator array for pressing keys of the mechanical input device based on pressure air, the integrated actuator array being integrated into the pressure air regulator and operationally coupled to the distribution unit, the integrated actuator array comprising integrated cylinders and pistons, each integrated cylinder being operationally connected to a distribution aperture.

5. The system of claim 4, wherein the system further comprises at least one transfer channel for connecting an integrated cylinder to an entrance aperture, the transfer channel being arranged to transfer pressure air at the level of the second contact surface.

6. The system of claim 5, wherein the system comprises a transfer unit between the distribution unit and the actuator array, the transfer unit having the at least one transfer channel as a groove on the surface of the transfer unit.

7. The system of claim 1, wherein the distribution unit further comprises an air inlet through a side wall of the spherically symmetric chamber, the air inlet and the inlet aperture arranged to be in contact over a predetermined rotational angle of the distribution unit and the receive unit.

* * * * *